United States Patent
Push

(10) Patent No.: US 11,993,196 B2
(45) Date of Patent: May 28, 2024

(54) SHELF SYSTEM

(71) Applicant: Adrian Steel Company, Adrian, MI (US)

(72) Inventor: Zachary John Push, Allen Park, MI (US)

(73) Assignee: Adrian Steel Company, Adrian, MI (US)

( * ) Notice: Subject to any disclaimer, the term of this patent is extended or adjusted under 35 U.S.C. 154(b) by 306 days.

(21) Appl. No.: 17/450,843

(22) Filed: Oct. 14, 2021

(65) Prior Publication Data

US 2023/0124241 A1 Apr. 20, 2023

(51) Int. Cl.
*B60R 11/00* (2006.01)
*B60P 3/14* (2006.01)
*B60P 7/08* (2006.01)
*B60R 7/02* (2006.01)

(52) U.S. Cl.
CPC .............. *B60P 3/14* (2013.01); *B60P 7/0815* (2013.01); *B60R 7/02* (2013.01); *B60R 2011/0024* (2013.01)

(58) Field of Classification Search
CPC .. B60P 3/14; B60P 7/0815; B60P 7/08; B60R 7/02; B60R 13/02; B60R 11/00; B60R 2011/0029; B60R 2011/0052; A47B 88/43; A47B 88/402; A47B 88/483; A47B 47/0083; A47B 47/024; A47B 67/04
USPC ............ 410/105; 296/182.1, 3, 181.1, 183.1, 296/186.2, 26.02, 36, 43
See application file for complete search history.

(56) References Cited

U.S. PATENT DOCUMENTS

| 1,279,635 | A | | 2/1917 | Belvel |
| 1,453,362 | A | | 3/1922 | Loveland |
| 1,601,990 | A | | 10/1924 | Wann |
| 2,091,070 | A | | 8/1937 | Girl |
| 2,784,027 | A | | 3/1957 | Temp |
| 2,825,617 | A | | 3/1958 | Morgan |
| 3,381,835 | A | | 5/1968 | Lee |
| 3,394,666 | A | | 7/1968 | Pearlman |
| 3,534,892 | A | | 10/1970 | Truelove, Sr. |
| 3,749,465 | A | * | 7/1973 | Newcomer ............. F16B 12/22 312/263 |

(Continued)

FOREIGN PATENT DOCUMENTS

| CZ | 7078 U1 | * | 4/1998 | |
| DE | 20308057 U1 | * | 8/2004 | ............. A47B 88/48 |

(Continued)

OTHER PUBLICATIONS

Canadian Intellectual Property Office, Examiner's Report for Application No. CA3155285, dated Jul. 18, 2023, 4 pages.

*Primary Examiner* — Hilary L Gutman
(74) *Attorney, Agent, or Firm* — Marshall & Melhorn, LLC

(57) ABSTRACT

A shelf system may have a framework with several support members. The support members may support at least one movable shelf. The system may have an upper bracket connected to one of the support members and a rail adapted to permit selective sliding movement of the upper bracket with respect to the rail. The rail may be connected to one of the support members. The rail may extend toward another support member, but it may terminate before it reaches the support member leaving a gap between the rail and support member.

20 Claims, 6 Drawing Sheets

(56) References Cited

U.S. PATENT DOCUMENTS

| | | | |
|---|---|---|---|
| 3,894,634 A * | 7/1975 | Gotham | A47F 5/0093 211/186 |
| 4,131,203 A * | 12/1978 | Bridges | A47F 5/0025 211/88.01 |
| 4,191,436 A * | 3/1980 | Cherry | E05B 65/46 312/333 |
| 4,249,295 A | 2/1981 | Lance | |
| 4,305,695 A | 12/1981 | Zachrich | |
| 4,469,364 A | 9/1984 | Rafi-Zadeh | |
| 4,482,066 A * | 11/1984 | Dykstra | A47B 88/493 211/151 |
| 4,573,731 A | 3/1986 | Knaack et al. | |
| 4,681,360 A | 7/1987 | Peters et al. | |
| 4,681,371 A | 7/1987 | Leonard | |
| 4,705,315 A | 11/1987 | Cherry | |
| 4,733,898 A | 3/1988 | Williams | |
| 4,789,195 A | 12/1988 | Fletcher | |
| 4,824,158 A | 4/1989 | Peters et al. | |
| 4,830,242 A | 5/1989 | Painter | |
| 4,889,377 A * | 12/1989 | Hughes | B60P 3/14 296/3 |
| 4,909,558 A | 3/1990 | Roshinsky | |
| 4,917,430 A | 4/1990 | Lawrence | |
| 5,046,913 A | 9/1991 | Domek et al. | |
| 5,064,335 A | 11/1991 | Bergeron et al. | |
| 5,088,636 A | 2/1992 | Barajas | |
| 5,090,335 A | 2/1992 | Russell | |
| 5,306,064 A * | 4/1994 | Padovano | B60P 7/08 248/228.2 |
| 5,495,954 A | 3/1996 | Schmit | |
| 5,498,048 A | 3/1996 | Shelby, Jr. | |
| D370,200 S | 5/1996 | Garoutte | |
| 5,564,767 A | 10/1996 | Strepek | |
| 5,570,942 A | 11/1996 | Vonier | |
| 5,588,540 A | 12/1996 | Schmit | |
| 5,743,584 A | 4/1998 | Lance et al. | |
| 5,845,952 A | 12/1998 | Albertini et al. | |
| 5,848,711 A | 12/1998 | Schmit | |
| 5,848,818 A | 12/1998 | Flueckinger | |
| 5,895,086 A | 4/1999 | Carico | |
| 5,897,154 A | 4/1999 | Albertini et al. | |
| D411,164 S | 6/1999 | Harris | |
| 5,944,371 A | 8/1999 | Steiner et al. | |
| 5,979,725 A | 11/1999 | Lehrman | |
| 5,996,868 A | 12/1999 | Paradis | |
| 6,065,792 A | 5/2000 | Sciullo et al. | |
| D426,187 S | 6/2000 | Schultz | |
| 6,076,906 A * | 6/2000 | Royal | H05K 7/1421 312/273 |
| 6,199,966 B1 | 3/2001 | Fulterer | |
| 6,203,087 B1 | 3/2001 | Lance et al. | |
| 6,270,138 B1 | 8/2001 | Laskowski et al. | |
| 6,318,781 B1 | 11/2001 | McKee | |
| 6,328,364 B1 | 12/2001 | Darbishire | |
| 6,328,635 B1 | 12/2001 | Adsit | |
| 6,406,045 B1 | 6/2002 | Farkash | |
| 6,416,143 B1 * | 7/2002 | Janson | A47B 53/02 403/256 |
| D467,863 S | 12/2002 | Boerret et al. | |
| 6,491,331 B1 | 12/2002 | Fox | |
| 6,516,983 B2 | 2/2003 | Sotiroff et al. | |
| 6,659,524 B1 | 12/2003 | Carlson | |
| 6,685,249 B2 | 2/2004 | Schneider | |
| 6,695,375 B1 | 2/2004 | May | |
| 6,705,656 B2 | 3/2004 | Keller | |
| 6,712,415 B1 | 3/2004 | Darbishire et al. | |
| 6,811,086 B1 | 11/2004 | Johnson | |
| 6,866,316 B1 | 3/2005 | Harder et al. | |
| 6,923,534 B2 | 8/2005 | Axelson | |
| 6,935,670 B2 | 8/2005 | Bright | |
| D525,934 S | 8/2006 | Panasewicz et al. | |
| 7,083,219 B1 | 8/2006 | Gregory | |
| 7,090,272 B2 | 8/2006 | Pero | |
| 7,111,887 B2 | 9/2006 | Cooley | |
| 7,121,603 B2 | 10/2006 | Stevenson et al. | |
| 7,137,512 B2 * | 11/2006 | Nguyen | H02B 1/36 211/183 |
| 7,159,917 B2 | 1/2007 | Hasberg | |
| 7,182,396 B2 * | 2/2007 | Taylor | B60P 3/14 296/3 |
| 7,219,941 B1 | 5/2007 | San Paolo et al. | |
| D549,154 S | 8/2007 | Panasewicz et al. | |
| 7,270,360 B2 | 9/2007 | Frasure et al. | |
| 7,309,093 B2 | 12/2007 | Ward | |
| D577,328 S | 9/2008 | Vrbas | |
| 7,419,203 B2 | 9/2008 | Chandler et al. | |
| 7,445,263 B1 | 11/2008 | Bluhm | |
| 7,494,032 B2 * | 2/2009 | Lussier | B60P 3/14 224/404 |
| 7,530,618 B2 | 5/2009 | Collins et al. | |
| 7,543,872 B1 | 6/2009 | Burns et al. | |
| 7,543,873 B1 | 6/2009 | Thornsberry | |
| 7,597,222 B2 | 10/2009 | Bishop et al. | |
| 7,641,253 B2 | 1/2010 | Steiger et al. | |
| 7,784,885 B2 | 8/2010 | Steiger et al. | |
| 8,157,312 B2 | 4/2012 | Bliss, Jr. et al. | |
| 8,353,563 B2 | 1/2013 | Bonat | |
| 8,408,638 B2 | 4/2013 | Pencak et al. | |
| 8,414,046 B2 | 4/2013 | Pencak et al. | |
| 8,449,022 B2 | 5/2013 | Pencak et al. | |
| 8,651,351 B2 | 2/2014 | Fowler et al. | |
| 8,746,771 B1 | 6/2014 | Farber | |
| 8,763,820 B2 * | 7/2014 | Hanley | B60R 11/06 211/88.01 |
| 8,845,043 B2 | 9/2014 | Bonat | |
| 8,925,777 B1 * | 1/2015 | Casucci | B60R 9/065 224/404 |
| 8,944,483 B2 | 2/2015 | Richter | |
| 8,974,160 B2 * | 3/2015 | Bender | B60P 7/06 410/104 |
| 9,010,830 B2 | 4/2015 | Hanley | |
| 9,173,486 B2 | 11/2015 | Richter | |
| 9,186,288 B2 * | 11/2015 | Sartin | B60R 11/00 |
| 9,233,647 B1 | 1/2016 | Hanley et al. | |
| 9,243,662 B2 | 1/2016 | Bonat | |
| 9,301,609 B2 | 4/2016 | Muller et al. | |
| 9,321,402 B2 | 4/2016 | Nedelman | |
| 9,346,391 B2 | 5/2016 | Workman et al. | |
| 9,381,872 B2 | 7/2016 | Hanley | |
| 9,669,773 B2 | 6/2017 | Hanley | |
| 9,796,339 B2 | 10/2017 | Hanley et al. | |
| 9,834,149 B2 | 12/2017 | Hanley | |
| 10,046,719 B2 | 8/2018 | Workman et al. | |
| 10,106,094 B2 | 10/2018 | Hanley | |
| 10,172,452 B2 | 1/2019 | Hanley et al. | |
| 10,334,944 B2 | 7/2019 | Hanley | |
| 10,384,593 B2 | 8/2019 | Altobelli | |
| 10,414,342 B2 | 9/2019 | Williams et al. | |
| 10,610,012 B2 | 4/2020 | Hanley et al. | |
| 10,703,292 B2 | 7/2020 | Hanley | |
| 10,882,456 B2 | 1/2021 | Williams et al. | |
| 10,913,398 B2 | 2/2021 | Hanley | |
| 11,000,123 B2 | 5/2021 | Hanley et al. | |
| 11,014,483 B2 | 5/2021 | Altobelli | |
| 2004/0120798 A1 * | 6/2004 | Davis | B66C 1/12 414/268 |
| 2005/0225108 A1 | 10/2005 | Panasewicz et al. | |
| 2006/0097021 A1 | 5/2006 | Stanton | |
| 2006/0237503 A1 | 10/2006 | Langelier | |
| 2007/0131729 A1 | 6/2007 | Kopf | |
| 2008/0006593 A1 * | 1/2008 | Tenreiro | H05K 7/18 211/162 |
| 2008/0231066 A1 | 9/2008 | Harrell | |
| 2009/0140537 A1 * | 6/2009 | Kittelson | F25D 23/10 312/404 |
| 2009/0289017 A1 * | 11/2009 | Koeze | A47B 43/00 211/1.3 |
| 2011/0018411 A1 | 1/2011 | Steiger et al. | |
| 2013/0094929 A1 | 4/2013 | Bluhm | |
| 2013/0168991 A1 | 7/2013 | Perakis | |
| 2014/0305977 A1 | 10/2014 | Sparks | |

(56) References Cited

U.S. PATENT DOCUMENTS

| | | | |
|---|---|---|---|
| 2014/0354001 A1 * | 12/2014 | Hanley | A47B 57/10 |
| | | | 296/24.44 |
| 2015/0001860 A1 | 1/2015 | Muller et al. | |
| 2015/0014381 A1 | 1/2015 | Hanley | |
| 2015/0034580 A1 | 2/2015 | Hofvander | |
| 2015/0175086 A1 | 6/2015 | Hanley | |
| 2015/0203053 A1 | 7/2015 | Carlsson | |
| 2016/0375837 A1 * | 12/2016 | Hanley | A47B 81/00 |
| | | | 211/70.6 |
| 2018/0236942 A1 * | 8/2018 | Williams | B60R 9/065 |
| 2021/0101535 A1 | 4/2021 | Williams et al. | |
| 2021/0146849 A1 | 5/2021 | Hanley | |
| 2021/0219716 A1 | 7/2021 | Hanley et al. | |

FOREIGN PATENT DOCUMENTS

| | | | | |
|---|---|---|---|---|
| DE | 102018116219 A1 * | 1/2020 | | F24C 15/168 |
| DE | 102019116051 A1 * | 10/2020 | | A47B 47/00 |
| DE | 102019116083 A1 * | 10/2020 | | A47B 45/00 |
| EP | 3067238 A1 * | 9/2016 | | B60R 11/00 |
| FR | 2885831 A1 * | 11/2006 | | B60P 1/003 |
| GB | 2132074 A * | 7/1984 | | A47B 88/14 |
| WO | 2016096898 A1 | 6/2016 | | |
| WO | 2016146444 A1 | 9/2016 | | |
| WO | 2017001455 A1 | 1/2017 | | |

* cited by examiner

SHELF SYSTEM

FIELD

One embodiment of a shelf system, such as for the interior of a vehicle, including the use and connection of the shelf to the vehicle is provided.

BACKGROUND

Utility/cargo vehicles often have interior spaces that can be fit with a wide variety of structures to store and secure cargo therein, such as shelving. Most shelving, however, is fixed in place, which makes it difficult to reach items on the shelf, particularly items that may be on the back of the shelf. Some shelving may be moved or adjusted, but often these prior art shelving systems are complicated, expensive and they do not adequately secure to the vehicle.

In view of the disadvantages associated with the prior art designs, it would be advantageous for a shelf in a shelf system to be movable so that items on the shelf can be easily reached. It would also be advantageous for the system to be simple and inexpensive, but robust and robustly connected to the vehicle.

SUMMARY

In one aspect, a shelf system may have a first leg and a second leg, a connecting member extending between the first leg and the second leg, a slide mount extending between the first leg and the second leg, a cross-piece extending between the first leg and the second leg, a side wall bracket connected to either the cross-piece or the first leg, the first bracket adapted to connect to a vehicle side wall, an upper bracket connected to the first leg, the upper bracket connected to a stationary rail adapted to permit selective sliding movement of the system with respect to the rail, and a rear bracket connected to the second leg, the rear bracket adapted to connect with a roof structure.

In another aspect, the legs may have an L-shaped cross section.

In another aspect, the legs may be substantially equal height, parallel and coplanar with one another.

In another aspect, the first and second legs may form a first side of the system, and third and fourth legs form a second side of the system.

In another aspect, the connecting member may have an L-shaped cross section having a first leg of the L adapted to connect with the first and second legs, and a second leg of the L adapted to connect with a vehicle floor.

In another aspect, another connecting member extends between the first and third legs and yet another connecting member extends between the third and fourth legs.

In another aspect, the slide mount has an inner surface with a first slide portion connected thereto.

In another aspect, a shelf having an edge portion, the edge portion having a second slide portion connected thereto, wherein said first and second slide portions cooperate to permit selective sliding motion of said shelf with respect to the first and second legs.

In another aspect, the stationary rail may be adapted to be fixed to a side wall of the vehicle, the stationary rail may extend at least partially parallel the slide mount, but laterally offset therefrom, and may extend only a portion of a length of the slide mount.

In another aspect, the stationary rail may have a channel and a selectively slidable block within the channel to which the upper bracket is connected.

In another aspect, the stationary rail may extend only for a portion of the length of the slide mount leaving a gap between an end of the stationary rail and the second leg.

In another aspect, a back panel, which may be substantially the height of the second and fourth legs, may extend from the second leg to the fourth leg.

In another aspect, a shelf system may have a first leg and a second leg, a side wall bracket connected to either a cross-piece connecting the legs, or the first leg, the first bracket adapted to connect to a vehicle side wall, an upper bracket connected to a stationary rail adapted to permit selective sliding movement of the system with respect to the rail, and a rear bracket connected to a rear panel, the rear bracket adapted to connect with a vehicle roof structure.

In another aspect, a shelf system may have a framework having a plurality of support members, where the plurality of support members may support at least one movable shelf, an upper bracket may connect to both one of the plurality of support members and a stationary rail may be adapted to permit selective sliding movement of the upper bracket with respect to the rail, the rail may extend from the upper bracket toward one of the plurality of support members, but may terminate before reaching the one of the plurality of support members leaving a gap between the rail and the one of the plurality of support members.

In another aspect, the rail may extend from a first leg of the framework and parallel but not coplanar with an edge of the at least one moveable shelf but the rail may terminate before reaching a second leg of the framework.

In another aspect, the rail may be fixed above and laterally offset from the first and second legs, the rail may have a channel that extends transverse a primary direction of the legs.

In another aspect, the upper bracket may orient the rail approximately 30-60 degrees from horizontal.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

Figure 1:
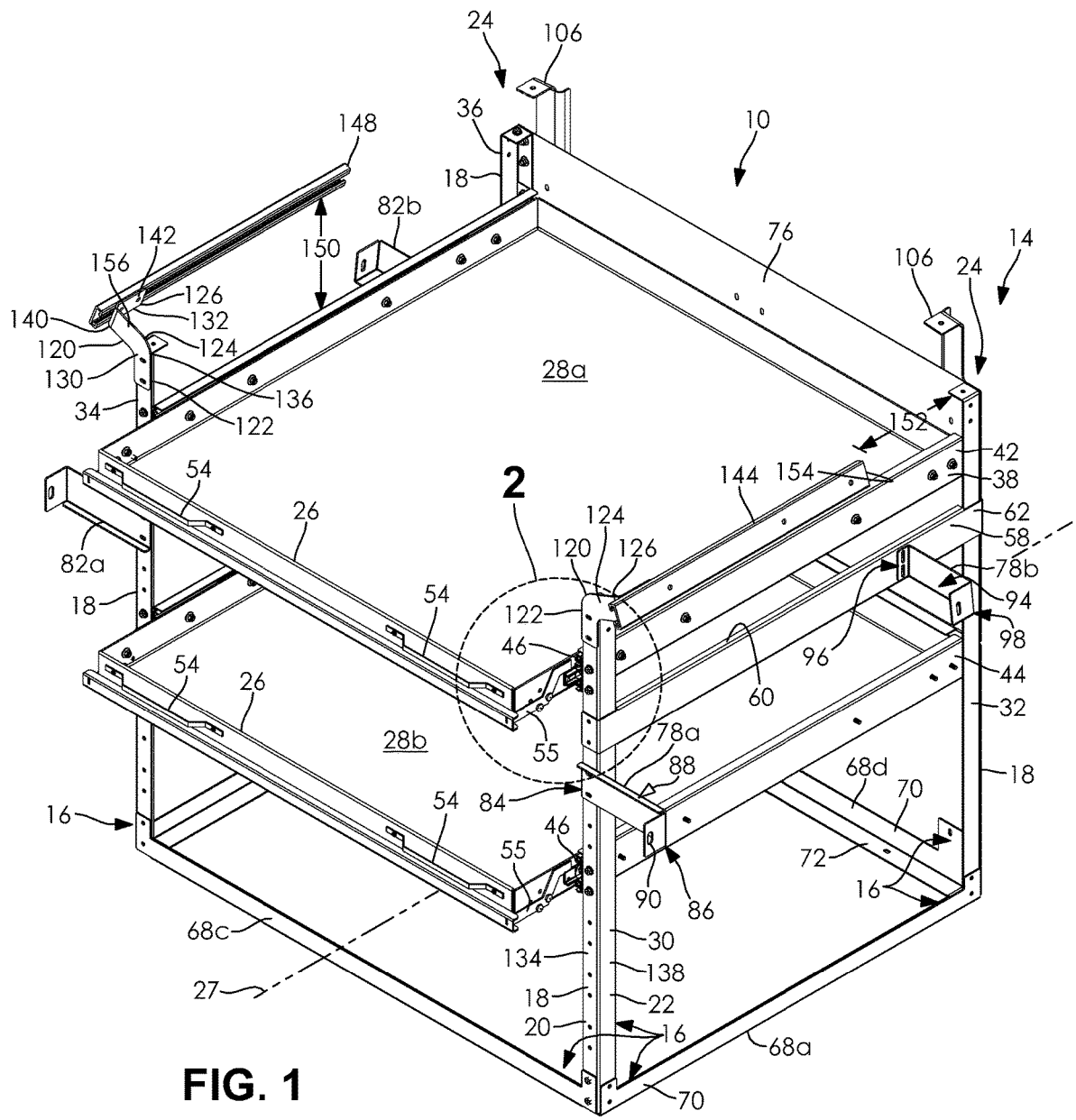
FIG. 1 is a schematic, upper perspective view of one embodiment of a shelf system.

It is to be understood that the invention may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Turning now to the figures, one embodiment of a shelf system 10 is depicted. The shelf system 10 may be adapted for use with a vehicle 12, such as a cargo vehicle, but the shelf system 10 may be used in other applications as well. Further, while a cargo vehicle, which may be a cargo van, is mentioned, the system 10 may be used with a wide variety of other vehicles.

The shelf system 10 may have a framework 14. The framework 14 may be comprised of a plurality of support members 16. The support members 16 may comprise legs 18 but other structures and devices may be included.

In one embodiment, the legs 18 may be such as lengths of material, including posts, rods, beams, bars and the like. The legs 18 in the system 10 may be the same or they may be different from one another in terms of type, material, shape and/or construction. In one embodiment, the legs 18 may be substantially the same.

In some cases, such as depicted in the figures, the legs 18 may be such as metal bars. The bars may be comprised of first and second flanges 20, 22 that have been joined together, or that are integrally formed, one piece and unitary with one another. The first and second flanges 20, 22 may be angled with respect to one another. The angle may be such as approximately 60-120 degrees with a preferred angle being approximately 90 degrees.

In one embodiment, there may be four legs 18, but a greater or lesser number of legs 18 may be used depending on the application. The legs 18 may be spaced from one another generally equal distance, but other distances are permissible to provide for a shelf system 10 of a particular dimension.

In the exemplary case where four legs 18 are used, the legs 18 may be generally located at or proximate the four corners of the system 10. FIG. 1 shows one embodiment, where the two rear legs may be located at the rear corners 24 of the system 10. In this embodiment, a front edge 26 of at least one shelf 28a of the system 10 may be longitudinally offset from the front legs 18. In other words, the front edge 26 extends beyond the legs 18.

The system 10 may have a longitudinal axis 27. The system 10 may or may not be generally symmetrical about the longitudinal axis 27. In this context the term generally may indicate that the system 10 is mostly the same on either side of the longitudinal axis 27. By way of example, comparing the two sides of the system 10, there may be an extra set of fastener apertures and/or fasteners, or the fasteners/apertures may be of a different type, number or location, or a support member 16 may be in a different size, shape or location, but this is within the context of the term.

In the embodiment with four legs 18, with two front legs 18 and two rear legs 18, the front leg on one side may be a first leg 30, the rear leg on the same side may be a second leg 32, the front leg on an opposite side may be a third leg 34 and the rear leg on the same side as the third leg may be a fourth leg 36. The nomenclature regarding leg numbers is merely for purposes of convenience and illustration, and the leg numbers can be assigned different numbers.

The legs 30, 32, 34, 36 may be adapted to directly or indirectly support at least one shelf 28a thereon. In one embodiment, a first slide mount 38 may be located between the first and second legs 30, 32. The first slide mount 38 may be such as a post, rod, beam, bar or the like and it may be part of the support member 16. In one embodiment, the first slide mount 38 may be such as a bar that may have an inner surface 40 and an outer surface 42, where the two surfaces 40, 42 are generally planar and define a constant thickness between them.

The first slide mount 38 may be connected to the first and second legs 30, 32 through mechanical fasteners, welding, adhesives, male/female couplings and/or the like. The first slide mount 38 may extend generally parallel the shelf 28a and transverse the primary direction of the first and second legs 30, 32. A second slide mount 44 may be located on the opposite side of the shelf system 10 from the first slide mount 38. The second slide mount 44 may be positioned parallel the first slide mount 38 and span between the third and four legs 34, 36. The second slide mount 44 may be the same, or similar, in size and shape to the first slide mount 38. Additional slides mounts may be added to the system for additional shelves 28b.

Figure 2:
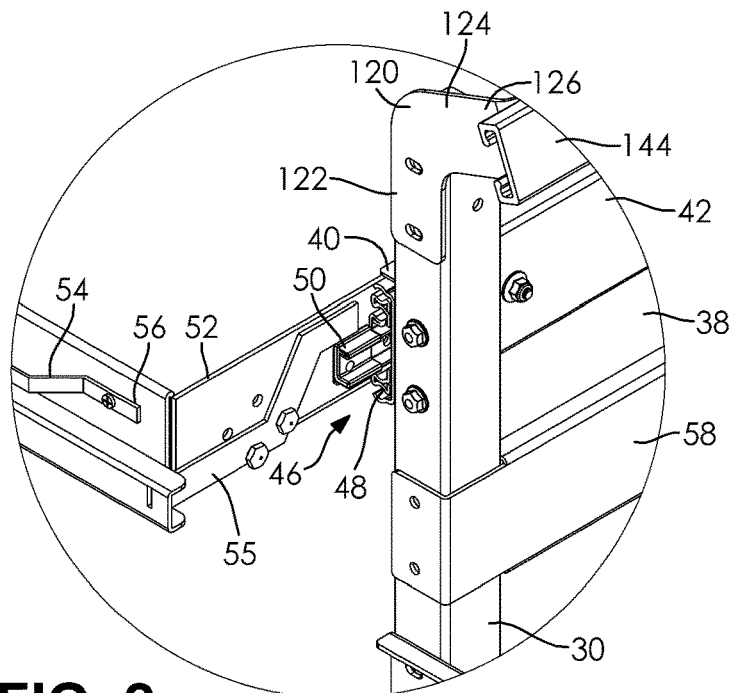
FIG. 2 is a detail from FIG. 1.

Slides 46, or glides, may connect the slide mounts 38, 44 to the shelves 28a, 28b. In one embodiment shown in FIG. 2, a first portion 48 of a slide 46 may be fixed to the inner surface 40 of the slide mount 38. A second portion 50 of a slide 46 may be fixed to an outer side surface 52 of a shelf 28. Wheels, bearings, and/or one or more low friction surfaces (not shown) may connect the first and second portions 48, 50 and permit relative movement between them.

At least one fixed handle 54 may be located on an outer front surface 56 of the shelf 28a, b. In some embodiments, there may be two fixed handles 54 located on the outer front surface 56. As the handle(s) 54 may be adapted to be grasped by a user, they may be a sufficient distance from the outer front surface 56 to permit the hand of a user to be selectively located between the handle 54 and the surface 56. The handle(s) 54 may be secured to the outer front surface 56 such as with mechanical fasteners, welding, adhesives and/or be integrally formed therewith so that it does not move with respect to the surface 56 or the shelf 28a, b.

In some embodiments, a lever 55 may be used to release one of the first and second portions 48, 50 of the slides 46 from the other which permits relative movement between the two and permits the shelf 28a, b to extend from or retract into the system 10. The lever 55 may be located below the handle 54 on the outer front surface 56 or it may be located below the surface 56 and/or below the shelf 28a, b. The lever 55 may be mechanically disconnected from the handle 54.

In some embodiments, the lever 55 may be located almost against surface 56 but relative movement is permitted. The lever 55 may have a width dimension that is much smaller than the handle 54. The lever 55 may be moves, such as depressed, with the user's thumb, or the like, to release one of the first and second portions 48, 50.

Figure 8:
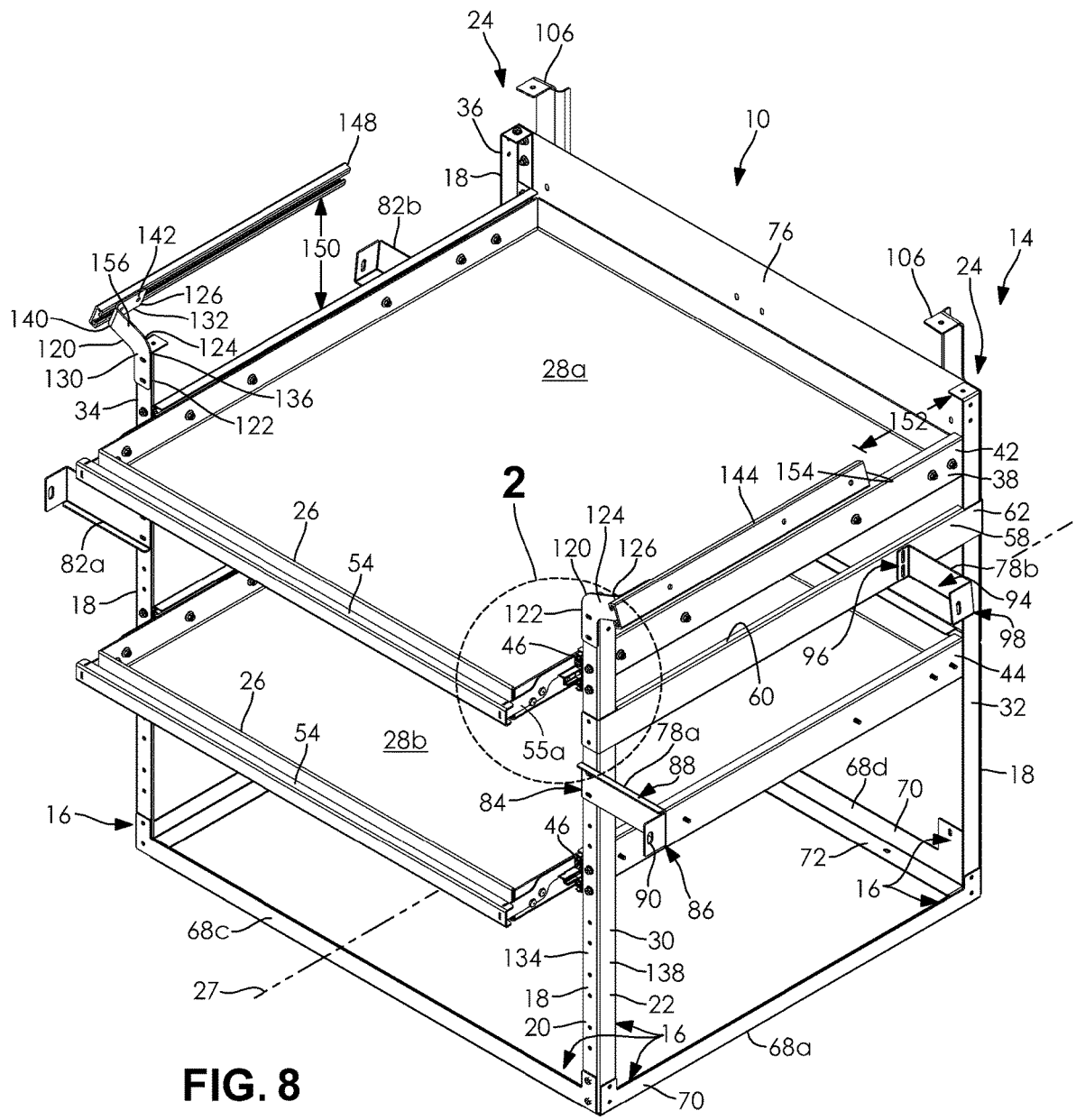
FIG. 8 is a schematic, upper perspective view of another embodiment of a shelf system.

Another embodiment may be seen in FIG. 8, which lacks a fixed handle 54 but lever 55a is adapted to function in the role of both a handle and a lever to engage the first and second portions 48, 50.

Turning back to FIG. 1, in some embodiments, one or more cross pieces 58 may be connect the legs 18. Each cross piece 58 may provide rigidity and support to the system 10. The cross piece 58 may be such as a post, rod, beam, bar or the like and it may be part of the support members 16. In one embodiment, the cross piece 58 may be such as a bar that may have an inner surface 60 and an outer surface 62, where the two surfaces 60, 62 are generally planar and define a constant thickness between them.

The cross piece 58 may be connected to the first and second legs 30, 32 through mechanical fasteners, welding, adhesives, male/female couplings and/or the like. The cross piece 58 may extend generally parallel the shelf 28a and/or b and the slide mount(s) 38, 44, and extend generally transverse the primary direction of the first and second legs 30, 32. A complementary cross piece 64 may be located on the opposite side of the shelf system 10 from the cross piece 58. The complementary cross piece 64 may be positioned parallel the cross piece 58 and span between the third and four legs 34, 36. The complementary cross piece 64 may be the same, or similar, in size and shape to the cross piece 58. Additional cross pieces may be added to the system 10.

The system 10 may also have one or more connecting members 68a-d. In some embodiments, the connecting members 68a-d may extend between some or all of the legs 30, 32, 34, 36. The figures depict one embodiment where one connecting member 68a-d extends between each of the legs 30, 32, 34, 36 of the system 10.

The connecting members 68a-d may provide rigidity and support to the system 10. In addition, they may be used to connect the system 10 to the vehicle 12. The connecting members 68a-d may be such as posts, rods, beams, bars or the like and they may be part of the support members 16. In one embodiment, the connecting members 68a-d may each be comprised of first and second flanges 70, 72 that have been joined together, or that are integrally formed, one piece and unitary with one another. The first and second flanges 70, 72 may be angled with respect to one another. The angle may be such as approximately 60-120 degrees with a preferred angle being approximately 90 degrees. In these cases, the connecting members 68a-d may have an L-shaped cross-section.

The first flange 70 of the connecting members 68a-d may be connected to the legs 30, 32, 34 and 36 through mechanical fasteners, welding, adhesives, male/female couplings and/or the like. A connecting member 68a connecting the first and second legs 30, 32 and a connecting member 68b connecting the third and fourth legs 34, 36 may extend parallel one another and a connecting member 68c connecting the first and third legs 30, 34 and a connecting member 68d connecting the second and fourth legs 32, 36 may extend parallel one another but generally transverse the connecting members 68a, b.

As mentioned above, in some embodiments, the connecting members 68a-d may have second flanges 72. The second flanges 72 may be parallel a floor surface 74 of the vehicle 12 in which the shelf system 10 is located. The second flanges 72 may have fastener apertures through which fasteners may extend to connect the system 10 to the vehicle floor surface 74. The fastener apertures may be aligned with pre-existing apertures in the floor surface 74 so that no additional apertures in the floor surface 74 may be required and the structural integrity of the floor system 74 is maintained.

The first flange 70, such as that on a connecting member 68d extending between the second and fourth legs 32, 36, may be connected to a back panel 76 of the system 10. The back panel 76 may extend from the second leg 32 to the fourth leg 36 in a continuous fashion. The back panel 76 may also extend substantially the height of the second and fourth legs 32, 36. In some embodiments, the back panel 76 may be a planar sheet of material adapted to at least partially close the back of the system 10. Closing the back of the system 10 may be helpful in retaining items on the system 10. The back panel may also function to close off the system 10 from other areas of the vehicle 12. Mechanical fasteners, welding, adhesives, male/female couplings and/or the like may be used to connect the connecting members 32, 36 to the back panel 76. The back panel 76 may be constructed of a rigid material, such as sheet metal, to provide strength and stability to the system 10. In other embodiments, no back panel 76 may be needed; in other embodiments, only a partial back 76 may be used.

In some embodiments, at least one side wall bracket 78a or b may be connected to the system 10. One end portion of a side wall bracket 78a orb may be connected the system 10 while another end portion of the side wall bracket 78a orb is adapted to connect with a side wall 80 of the vehicle 12.

In one embodiment, a forward side wall bracket 78a may be connected to the first leg 30. Further, a rear side wall bracket 78b may be connected to the outer surface 42 of the slide mount 38 or the outer surface 62 of a cross piece 58. Mechanical fasteners, welding, adhesives, male/female couplings and/or the like may be used to connect the side wall brackets 78a, b to the leg 30 and/or slide mount/cross piece 38, 58. It may be that a second forward side wall bracket 82a and a second rear side wall bracket 82b are used on the opposite side of the system 10. The second forward side wall bracket 82a and the second rear side wall bracket 82b may be the same or similar to the side wall bracket 78a and the rear wall bracket 78b described below.

Figure 6:
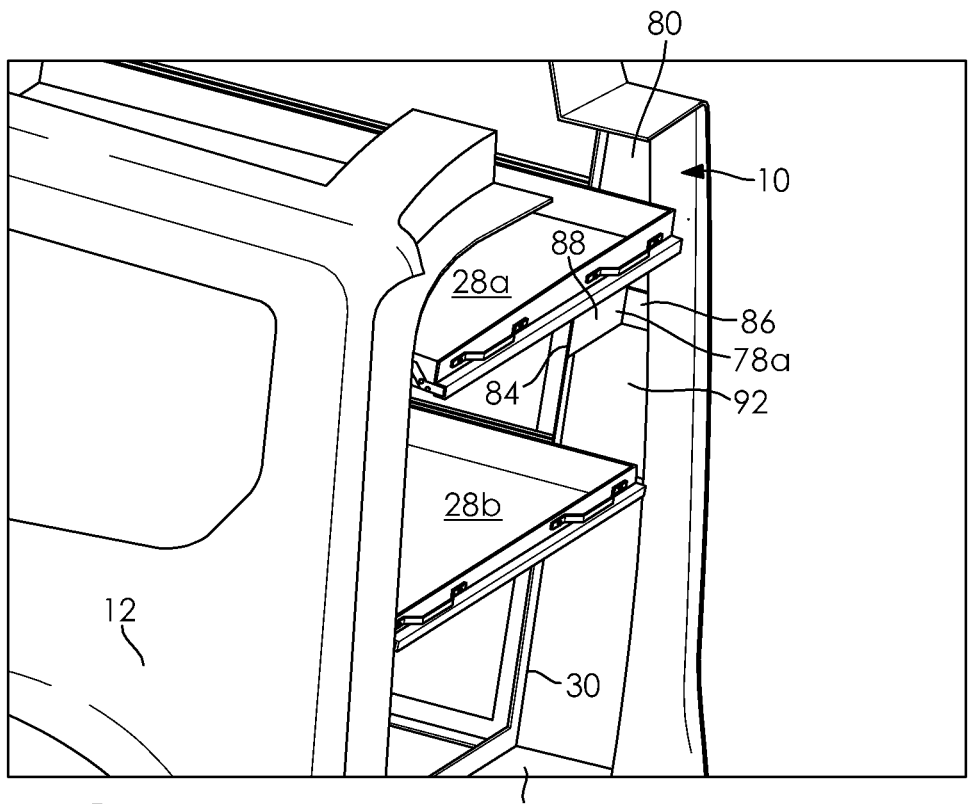
FIG. 6 is a schematic, upper, partial perspective view of the system from FIG. 1 in one embodiment of a vehicle.

The forward side wall bracket 78a may have first and second connection portions 84, 86 connected together by an extension portion 88. The first connection portion 84 may be directly connected to the first leg 30. The first connection portion 84 and the extension portion 88 may extend generally transverse both the primary directions of the first leg 30 and the slide mount 38 and/or cross piece 58. The second connection portion 86 may extend generally transverse the extension portion 88 and may extend parallel, but not coplanar with, the cross piece 58 and/or side mount 38. The second connection portion 86 may have a fastener aperture 90 for receiving a fastener that may extend through the second connection portion 86 and into the side wall 80 of the vehicle 12. In some embodiments, the second connection portion 86 and the fastener aperture 90 may be aligned with a pre-existing aperture in a D-pillar 92 of the vehicle 12, as shown in FIG. 6. Thus, by utilizing an existing aperture in the vehicle 12, an additional aperture is not needed and the structural integrity of the pillar is not compromised.

The rear side wall bracket 78b may be connected adjacent the back panel 76 on the cross-piece 58 or the slide mount 38. In one embodiment depicted in the Figures, the rear side wall bracket 78b is attached to the cross piece 58.

Figure 5:
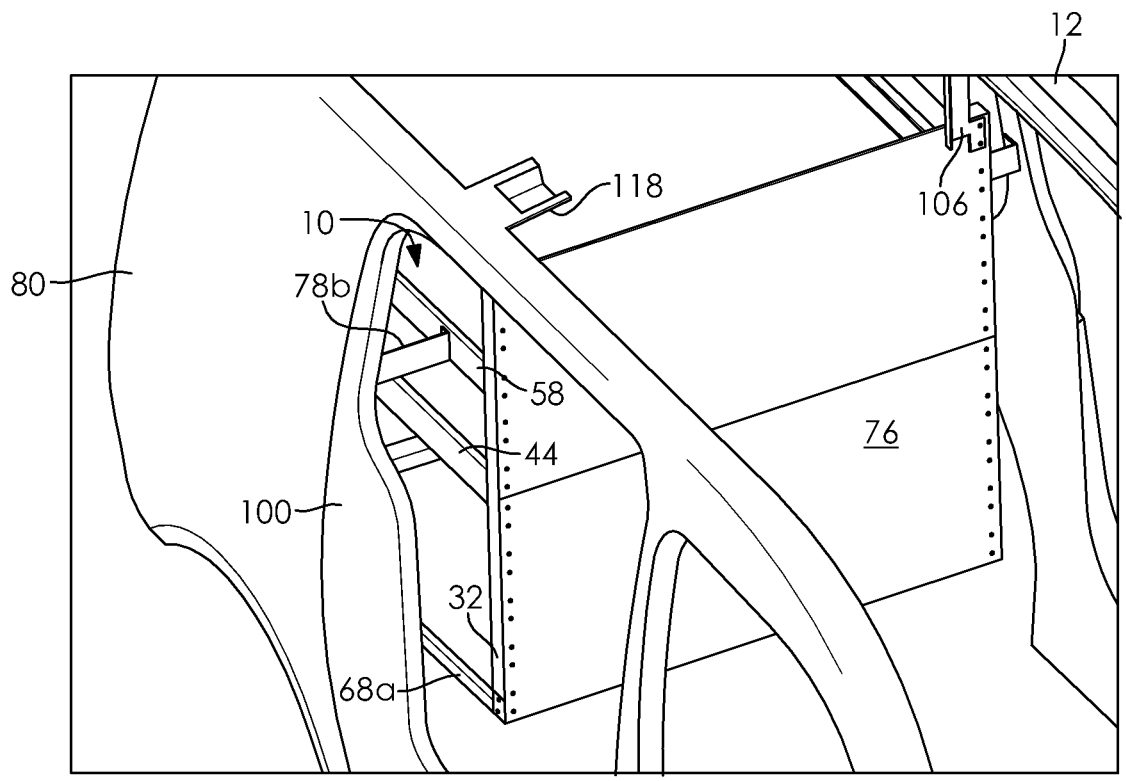
FIG. 5 is a schematic, upper, partial perspective view of the system from FIG. 1 in one embodiment of a vehicle.

The rear side wall bracket 78b may have an extension portion 94 and first and second connection portions 96, 98. The first connection portion 96 may be directly connected to the cross piece 58. The extension portion 94 may extend generally transverse the first connection portion 96 and the primary direction of the cross piece 58. The second connection portion 98 may extend generally transverse the extension portion 94 and may extend parallel, but not coplanar with, the cross piece 58 and/or the first connection portion 96. The second connection portion 98 may have a fastener aperture for receiving a fastener that may extend through the second connection portion 98 and into the side wall 80 of the vehicle 12. In some embodiments, the second connection portion 98 and the fastener aperture may be aligned with a pre-existing aperture in a C-pillar 100 of the vehicle, as shown in FIG. 5. Thus, by utilizing an existing aperture in the vehicle 10, an additional aperture is not needed and the structural integrity of the pillar is not compromised.

Figure 3:
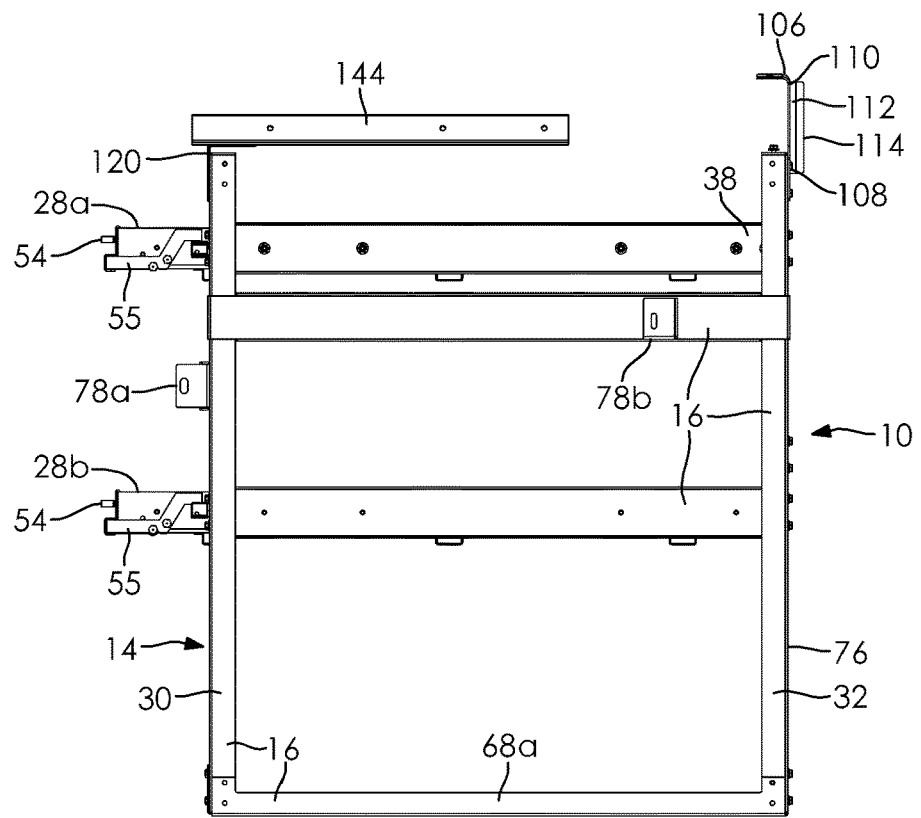
FIG. 3 is a side view of the system in FIG. 1.

As may be seen in FIG. 3, the forward side wall bracket 82a may be vertically below, or non-planar with, the rear side wall bracket 82b.

In some embodiments, at least one rear bracket 106 may be connected to the system 10. The rear bracket 106 may have a first end portion 108 connected to the system 10 and a second end portion 110 that is adapted to connect to the vehicle 12.

Figure 4:
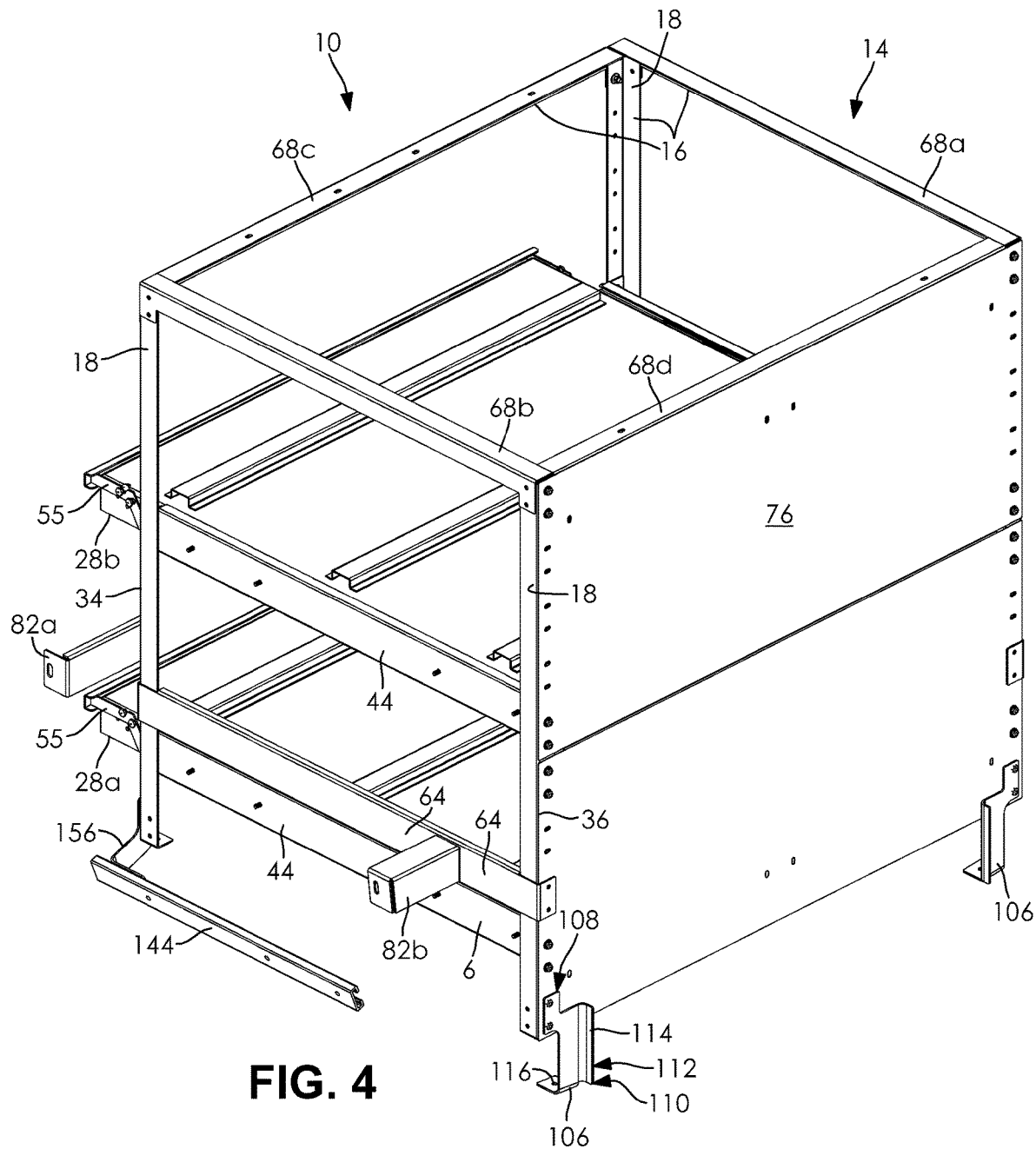
FIG. 4 is a bottom perspective view of the system in FIG. 1.

As shown in FIG. 4, the first end portion 108 may be connected to a leg of the system 10, such as the second and/or fourth leg 32, 36 of the system 10. The first end portion 108 may have a fastener aperture for receiving a fastener the connects the first end portion 108 to the leg 32, 36. The first end portion 108 may extend from an extension portion 112 of the rear bracket 106 in a coplanar and parallel fashion. A support flange 114 may extend at least along a portion of the extension portion 112. The support flange 114 may extend generally transverse the primary direction of the extension portion 112. The support flange 114 may add rigidity and strength to the rear bracket 106.

The second end portion 110 may be connected to the extension portion 112. The second end portion 110 may extend in a generally transverse direction to the extension portion 112.

Figure 7:
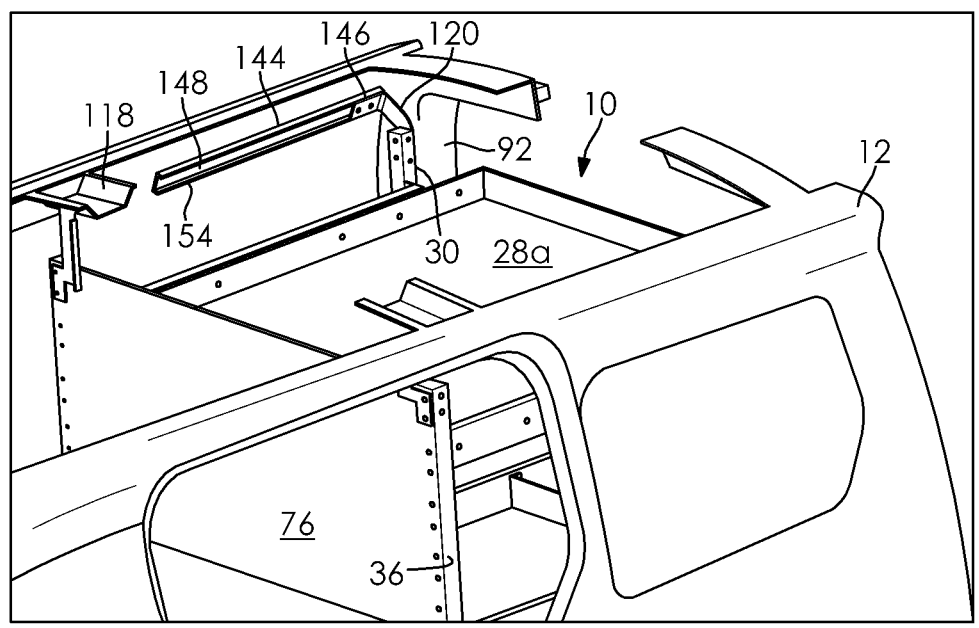
FIG. 7 is a schematic, upper, partial perspective view of the system from FIG. 1 in one embodiment of a vehicle.

The second end portion 110 may have a fastener aperture 116 for receiving a fastener that may extend through the second end portion 110 and into the vehicle 12. In one embodiment, the second end portion 110 and the fastener aperture 116 may be aligned with a vehicle roof bow 118 or other roof structural element, one embodiment of which is shown in FIG. 7. In some embodiments, the second end portion 110 and the fastener aperture 116 may be aligned with a pre-existing aperture in the roof bow 118 of the vehicle 10. Thus, by utilizing an existing aperture in the vehicle 10, an additional aperture is not needed and the structural integrity of the roof bow is not compromised.

In some embodiments, first and second rear brackets 106 may be used and connected to the second and fourth legs 32, 36 respectively. Each rear bracket 106 may be the same or similar in construction and function.

In some embodiments, such as shown in at least FIGS. 1 and 7, at least one upper bracket 120 may be provided. The upper bracket 120 may have a first connection end portion 122, an extension portion 124 and a second connection end portion 126. The end portions 122, 126 and the extension portion 124 may be unitary, one piece and integrally formed, or they may be comprised of individual pieces. In some embodiments, the upper bracket 120 may have a first side 130 and a second side 132 where the two sides 130, 132 define a constant thickness between them. The first connection end portion 122, the extension portion 124 and the second connection end portion 126 may have the same or similar lengths.

The first connection end portion 122 may be adapted to connect with a support member 16 of the framework 14. By way of example only, the first connection end portion 122 may be connected to one of the legs, such as the first and third legs 30, 34 of the system 10. In such an example, the first connection end portion 122 may have at least one aperture for receiving a mechanical fastener therethrough and into a leg 30, 34. While a fastener is mentioned, other connection devices are permissible including welding, adhesives, male/female couplings and the like.

The first connection end portion 122 may be at least substantially parallel with an outer face 134 of the leg 30, 34 from which it extends. The first connection end portion 122 uses a first transition 136 to connect with the extension portion 124. The first transition 136 may be such as through a radiused elbow, but other shapes and structures for the transition 136 may be permissible.

The first transition 136 may cause the extension portion 124 to be non-planar, or angled, with respect to a leg 30, 34 to which it is connected. In other words, the first transition 136 may direct the extension portion 124 and the second connection portion 126 of the upper bracket 120 above and to the side of a side leg face 138 of the first leg 30.

The extension portion 124 may connect with a second transition 140 to connect with the second connection end portion 126. The second transition 140 may be such as through a radiused elbow, but other shapes and structures for the transition 140 may be permissible.

The second transition 140 may cause the second connection portion 126 to be non-planar, or angled, with respect to the extension portion 124. In other words, the second transition 140 may direct the second connection portion 126 to extend at least partially parallel with, but not coplanar with the primary direction of the side mount 38.

The second connection portion 126 may have at least one fastener aperture 142. In one embodiment, a fastener may be located through the aperture 142 where it can be secured to a rail 144 or a slide member 146 located within the rail 144.

The rail 144 may be secured to the vehicle 12, such as the side wall 80 of the vehicle 12. Mechanical fasteners, welding, adhesives and/or male/female couplings may be used to secure the rail 144 to the vehicle 12.

The rail 144 and slide member 146 may be such as described and depicted in U.S. Pat. Nos. 8,974,160 and 10,604,057 both of which are fully incorporated by reference herein.

In some embodiments, the rail 144 includes a channel 148 of a predetermined shape. In some embodiments, the channel 148 may resemble a C-shaped in cross-section. The slide member 146 may have a profile that is in part or in whole complementary to the channel 148, may be received within the channel 148 so that the slide member 146 and may be slidably movable within the channel 148.

It can be appreciated from the foregoing that the system 20, being connected to the slide member 148, permits for longitudinal movement of the system 10 with respect to the fixed rail 144 which permits the longitudinal position of the system 10 within the vehicle 12 to be adjusted.

In some embodiments, the rail 144 may fixed to the vehicle 10 at an angle of 30-60 degrees from horizontal. The second connection end portion 126 of the upper bracket 120 is located at a complementary angle and position to the rail 144 for connection therewith. The position and angle of the second connection end portion 126 is made possible, at least in part, by the extension portion 124 of the upper bracket 120.

The rail 144 may extend for a portion of the longitudinal length of the system 10. In one embodiment, the rail 144 may extend generally parallel the slide mount 38 from one of the legs 30. The rail 144 may extend at least partially parallel but laterally offset from the slide mount 38. Thus, except for the upper bracket 120 there may be no connection between the rail 144 and the support member 16. In other words, there may be a continuous uninterrupted first gap 150 extending from the upper bracket 120 between the rail 144 and the support member 16.

It has been found, however, that the rail 144 need not extend the entire distance from the first leg 30 to the second leg 32. Instead, a second gap 152 may exist between a terminus 154 of the rail 144 and the second leg 32. In some cases, the rail 144 may extend between approximately 25-85 percent of the length of the slide mount 38. Preferably, the rail 144 may extend approximately 60-75 percent of the length of the slide mount 38, It has been found that a rail 144 extending only partially between the first leg 30 and the second leg may be need as the partial length rail 144 provides a sufficient longitudinal adjustment range for the system 10 and uses less material and is lighter weight.

In some embodiments, first and second upper brackets 120, 156 may be used and connected to the first and third legs respectively. Each upper bracket may be the same or similar in construction and function for connection with a respective rail 144.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A shelf system, comprising:
   a first leg and a second leg;
   a connecting member extending between the first leg and the second leg;
   a slide mount extending between the first leg and the second leg;
   a cross-piece extending between the first leg and the second leg;
   a first side wall bracket connected to the cross-piece and a second side wall bracket connected to the first leg, both side wall brackets adapted to connect to a vehicle side wall;
   an upper bracket connected to the first leg, the upper bracket connected to a stationary rail adapted to permit selective sliding movement of the upper bracket with respect to the rail; and
   a rear bracket connected to the second leg, the rear bracket adapted to connect with a roof structure.

2. The shelf system of claim 1, wherein the legs have an L-shaped cross section.

3. The shelf system of claim 1, wherein the legs are substantially equal height, parallel and coplanar with one another.

4. The shelf system of claim 1, wherein the first and second legs form a first side of the system, and third and fourth legs form a second side of the system.

5. The shelf system of claim 4, wherein the connecting member has an L-shaped cross section having a first leg of the L adapted to connect with the first and second legs, and a second leg of the L adapted to connect with a vehicle floor.

6. The shelf system of claim 5, wherein another connecting member extends between the first and third legs and yet another connecting member extends between the third and fourth legs.

7. The shelf system of claim 1, wherein the slide mount has an inner surface with a first slide portion connected thereto.

8. The shelf system of claim 7, further comprising a shelf having an edge portion, the edge portion having a second slide portion connected thereto, wherein said first and second slide portions cooperate to permit selective sliding motion of said shelf with respect to the first and second legs.

9. The shelf system of claim 7, wherein the stationary rail is adapted to be fixed to a side wall of the vehicle, the stationary rail extending at least partially parallel the slide mount, but laterally offset therefrom, and extending only a portion of a length of the slide mount.

10. The shelf system of claim 1, wherein the first and second side wall brackets are vertically offset from one another.

11. The shelf system of claim 1, wherein the stationary rail extends only for a portion of the length of the slide mount leaving a gap between an end of the stationary rail and the second leg.

12. The shelf system of claim 4, wherein a back panel, substantially the height of the second and fourth legs, extends from the second leg to the fourth leg.

13. A shelf system, comprising:
   a plurality of legs comprised of a forward pair of legs and a rear pair of legs;
   a plurality of side wall brackets, comprised of a forward pair of side wall brackets and a rear pair of side wall brackets, wherein the forward pair of side wall brackets are connected to the forward pair of legs and the rear pair of side wall brackets are connected to cross-pieces connecting the forward legs with the rear legs, the plurality of side wall brackets adapted to connect to vehicle side walls;
   an upper bracket connected to a stationary rail adapted to permit selective sliding movement of the upper bracket with respect to the rail; and
   a rear bracket connected to a back panel, the rear bracket adapted to connect with a vehicle roof structure.

14. A shelf system, comprising:
   a framework having a plurality of support members, wherein the plurality of support members support at least one movable shelf, and each of the plurality of support member has an upper terminus;
   an upper bracket connected to both one of the plurality of support members adjacent the upper terminus and a stationary rail located above the upper terminus adapted to permit selective sliding movement of the upper bracket with respect to the stationary rail,
   wherein the stationary rail extends from said upper bracket toward a rear support member of the plurality of support members, but terminates before reaching the rear support member leaving a gap between the stationary rail and the rear support member.

15. The system of claim 14, wherein the stationary rail extends from a front support member of the framework and parallel but not coplanar with an edge of the at least one moveable shelf but the stationary rail terminates before reaching the rear support member of the framework.

16. The system of claim 15, wherein the stationary rail is fixed above and laterally offset from the front and rear support members, the stationary rail having a channel that extends transverse a primary direction of the legs.

17. The system of claim 14, wherein the upper bracket orients the stationary rail approximately 30-60 degrees from horizontal.

18. The system of claim 1, wherein the cross-piece extends parallel the connecting member and the slide mount.

19. The system of claim 1, wherein the stationary rail is vertically and laterally offset from the cross-piece, the connecting member and the slide mount.

20. The system of claim 14, wherein the plurality of support members comprise a forward support member and the rear support member, wherein the stationary rail extends from the forward support member rearwardly parallel a first slide mount extending between the forward support member and the rear support member, wherein the at least one movable shelf is attached to the first slide mount.

* * * * *